(12) United States Patent
Kutz et al.

(10) Patent No.: US 6,868,500 B1
(45) Date of Patent: Mar. 15, 2005

(54) POWER ON RESET CIRCUIT FOR A MICROCONTROLLER

(75) Inventors: Harold Kutz, Snoquolmie, WA (US); Warren Snyder, Snohomish, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 580 days.

(21) Appl. No.: 09/887,955

(22) Filed: Jun. 22, 2001

Related U.S. Application Data

(60) Provisional application No. 60/243,708, filed on Oct. 26, 2000.

(51) Int. Cl.$^7$ .............................. G06F 1/26; G06F 1/32
(52) U.S. Cl. ...................... 713/300; 713/340; 327/143; 327/198; 323/266; 365/189.09; 365/226
(58) Field of Search ................................. 713/300, 340; 327/143, 198; 323/266; 365/226, 189.09

(56) References Cited

U.S. PATENT DOCUMENTS

| | | | | |
|---|---|---|---|---|
| 4,970,408 A | * | 11/1990 | Hanke et al. ................ | 327/143 |
| 5,202,687 A | | 4/1993 | Distinti ....................... | 341/158 |
| 5,455,731 A | * | 10/1995 | Parkinson .................... | 361/71 |
| 5,552,725 A | * | 9/1996 | Ray et al. .................... | 327/143 |
| 5,564,010 A | * | 10/1996 | Henry et al. .................. | 714/22 |
| 5,889,723 A | * | 3/1999 | Pascucci ...................... | 365/229 |
| 6,144,327 A | | 11/2000 | Distinti et al. ............... | 341/126 |

OTHER PUBLICATIONS

IBM TDB, vol. 36, Issue 8, "Electronic Circuit Protector–Circuit Breaker", pp. 179–180, Aug. 1, 1993.*
"A Power Supply Pump Circuit for a Microcontroller"; Aug. 30, 2001; U.S. Appl. No. 09/922,419; Kutz et al.
"Novel Method and System for Interaction Between a Processor and a Power on Reset Circuit to Dynamically Control Power States in a Microcontroller"; Jun. 22, 2001; U.S. Appl. No. 09/887,923; Kutz et al.

* cited by examiner

*Primary Examiner*—Rehana Perveen
(74) *Attorney, Agent, or Firm*—Wagner, Murabito & Hao LLP

(57) ABSTRACT

In accordance with one embodiment of the present invention, a circuit provides power stability functions for a microcontroller, during startup and normal operations performing power on reset functions and an array of power stability functions. The power on reset functions hold the microcontroller in a safe reset condition, reinforce the POR hold, and force its switch mode pump to drive up voltage provided to its common supply source. The power stability functions constitute a power on reset function, a power supply health, e.g., power state condition monitoring function, a control function for dynamically controlling the common supply source, and auxiliary functions, which may be protective of a flash memory. The power on reset function operates at a fixed and/or programmably changeable voltage levels. In one embodiment, the POR circuit is interconnected with a processor through a bus, enabling programmatic processor control of microcontroller power through interaction with the POR circuitry.

22 Claims, 7 Drawing Sheets

POWER ON RESET CIRCUIT FOR A MICROCONTROLLER

RELATED U.S. APPLICATION

This application claims priority to the copending provisional United States patent application, Ser. No. 60/243,708, entitled "Advanced Programmable Microcontroller Device," with filing date Oct. 26, 2000, and assigned to the assignee of the present application.

BACKGROUND OF THE INVENTION

1. Field of the Invention

The present invention relates to the field of microcontrollers. Specifically, the invention is a circuit designed to perform a power on reset (POR) function.

2. Related Art

Microcontrollers have embedded logic units, memories, power sources, and other circuits. Power On Reset (POR) circuits are typically used in microcontrollers to initialize stable power states, ensuring that booting is accomplished safely. POR circuits achieve this by forcing the microcontroller system into a reset state upon power supply activation and holding it in that state until power is stabilized, as indicated by a parameter, such as voltage, reaching a certain level. Conventionally, this is the sole function of a POR circuit.

However, several other microcontroller functions related to power state stability either go unaddressed, or require separate functionalities to enable them. In the conventional art, simply enabling more than a single POR level for a given microcontroller is one such function. Another is control of power sources supplying microcontrollers. The power for microcontrollers is typically provided by a switch mode pump (SMP), including power during boot-up. POR circuits, conventionally, are separate from SMP control, both during and after booting-up the system.

Further, certain microcontroller operational functions may be disrupted by power system instability. A microcontroller's output may be corrupted and data lost due to power instability during routine (e.g., post-startup) operation. Microcontroller output corruption is problematic, especially in critical instrumentation and control applications. In certain critical applications, variation in a microcontroller's output due to power instability can have deleterious consequences. Further still, microcontroller performance is related to power system status. Performance may be optimized by dynamically adjusting the microcontroller power system to corresponding optimal power states.

Also, microcontrollers have embedded memory subsystems, such as flash memories. Among its other functionalities, flash memory is one microcontroller system in particular, which is vulnerable to power system instability. Conventionally, these crucial operational needs are addressed by provision of system resources other than POR circuitry, if they are addressed at all.

The conventional art is problematic because it either fails to address microcontroller power stability issues beyond initial boot-up POR, requires the dedication of existing system resources to address them, or requires the provision of additional resources to address them. In the first instance, power stability problems remain unsolved. In the second two instances, the solutions are expensive.

Dedicating existing resources, internal to the microcontroller, to sense, analyze, and react to post-booting power instability removes circuitry from other possible applications. Further, these effectively internal control functions demand the expenditure of power, heat dissipation, logic, memory, and other system infrastructure and energy. These finite system resources then become unavailable for executing the design external control functions of the microcontroller. Thus, microcontroller performance can suffer.

Further, providing additional resources, e.g., adding them into the microcontroller as build-ons, to sense, analyze, and react to post-booting power instability, makes the microcontroller more expensive to manufacture and thus to acquire. Further still, such a microcontroller becomes more expensive to operate, in terms of also demanding the additional expenditures of power, heat dissipation, logic, memory, and other system infrastructure and energy to meet an effectively internal control function. These resources also thus become unavailable for executing the design external control functions of the microcontroller. Thus, the performance of microcontrollers, even with power stability resources built-on according to the conventional art, may suffer.

Conceivably, a completely new system of powering microcontrollers may be developed which regulates the stability of the power both during and after boot-up, which dispenses with the foregoing problems. However, such a system would abandon advantages inherent in existing microcontroller power systems. Also, such a system would be expensive to develop and to implement.

What is needed is a robust circuit and/or system which can effectively function to provide power on reset (POR) capabilities for a microcontroller, at more than a single level, as well as power stability functions not necessarily limited to safe boot-up. What is also needed is a circuit and/or system that can utilize POR circuitry resources to additionally control a microcontroller's switch mode pump (SMP), both during boot-up and during normal post-boot-up operations. Further, what is needed is a circuit and/or system which can apply POR circuitry resources to other power stability applications. Further still, what is needed is a circuit and/or system retaining the advantages of existing POR technology to accomplish the foregoing requirements with no extra demand on system resources or requirement for additional system resources.

SUMMARY OF THE INVENTION

The present invention provides a robust circuit and system which effectively functions to provide power on reset (POR) capabilities for a microcontroller, at more than a single level, as well as post-boot-up power stability functions. The present invention also provides a circuit and system that utilizes the resources of installed POR circuitry to additionally control a microcontroller's switch mode pump (SMP), both during boot-up and during normal post-boot-up operations. Further, the present invention provides a circuit and system that applies the resource of embedded POR circuitry to other power stability applications. Further still, the present invention provides a circuit and system that retains the advantages of existing POR technology, accomplishing the foregoing achievements without placing any extra demand on system resources or requiring additional systems.

In one embodiment, the present invention provides a robust circuit and system which effectively functions to provide microcontroller POR functionality at two levels. Unlike conventional POR technology, the present embodiment also advantageously monitors and controls several post-boot-up power stability functions.

In one embodiment, the present invention controls a microcontroller's SMP during boot-up. After successful boot-up and transition to normal power operation, the present embodiment continues to provide control to SMP function. Advantageously, this regulates operational microcontroller power. In one embodiment, post-boot-up SMP control is programmable.

In one embodiment, the present invention provides a circuit and system that utilizes the resources extant in embedded POR circuitry to other power stability monitoring and control applications. In one embodiment, a power supply health, e.g., condition indication and warning system is enabled. In one embodiment, a power supply health indication signal is made available to a processor for programmed responses, via software. In one embodiment, an auxiliary indicating signal is enabled, which may be utilized in any way. In one embodiment, the auxiliary signal provides a trip warning to protect a microcontroller's internal memories, e.g., flash memory.

Importantly, the present invention fully retains the advantages of existing POR technology. One embodiment thereof uses a POR circuit to all of the foregoing embodiments. Advantageously, the present embodiment utilizes only system resources already designated for design POR requirements, thus requiring no additional systems.

These and other objects and advantages of the present invention will become obvious to those of ordinary skill in the art after reading the following detailed description of the preferred embodiments, which are illustrated in the various drawing figures.

DETAILED DESCRIPTION OF THE INVENTION

Figure 1:
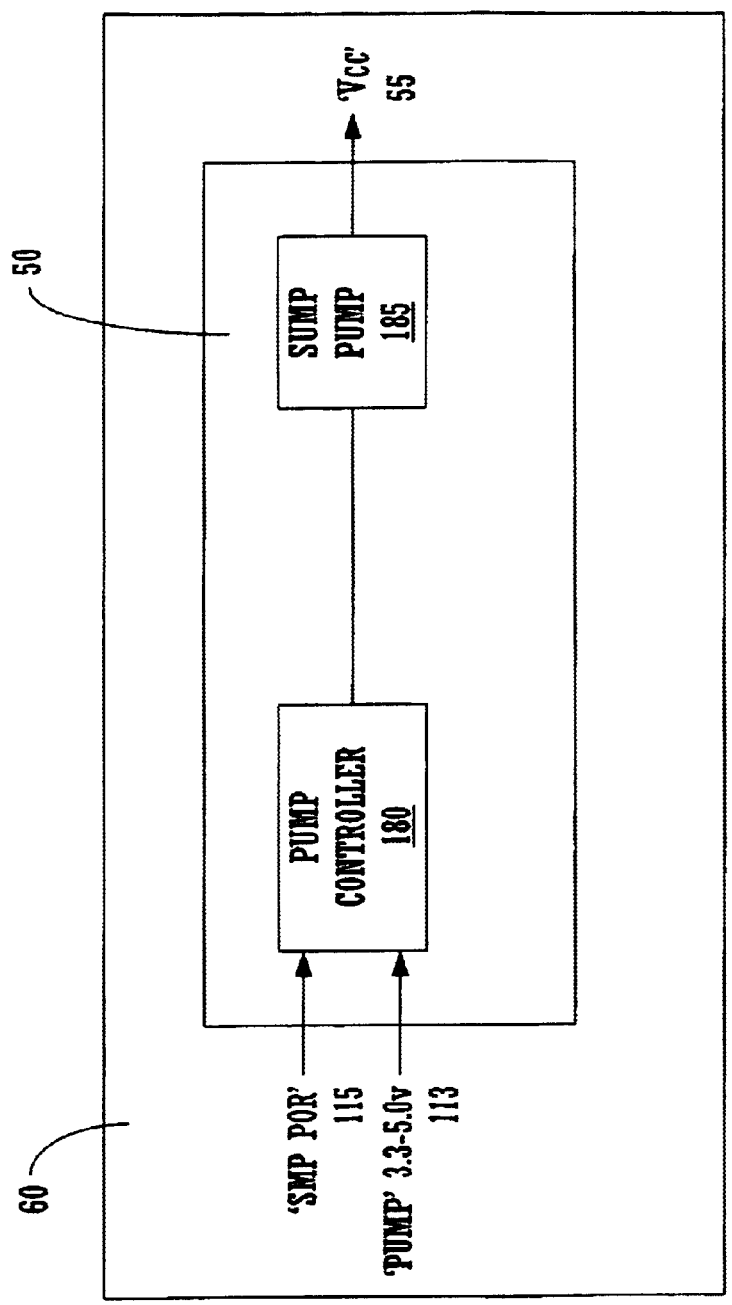
FIG. 1 is a block diagram depicting a SMP under control of a microcontrollers pump controller, receiving two input signals, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow may be presented in terms of procedures, logic blocks, processing, and other symbolic representations of operations on data bits within a programmable logic device, or other electronic device. These descriptions and representations are used by those skilled in the electronic arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, or magnetic signals capable of being stored, transferred, combined, compared, and otherwise manipulated in an electronic system. It has proven convenient at times, principally for reasons of common usage, to refer to these signals as bits, bytes, values, elements, symbols, characters, terms, numbers, streams, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "asserting," "de-asserting," "comparing," "controlling," "dividing," "driving," "forcing," "generating," "idling," "indicating," "initiating," "monitoring," "multiplexing," "operating," "performing," "protecting," "providing," "raising," "receiving," "registering," "resetting," "sensing," "tripping," "utilizing," "validating," or the like, refer to the action and processes (e.g., processes 500, of FIG. 5) of microcontrollers, or similar intelligent electronic and/or microelectronic devices, that manipulate(s) and transform(s) data represented as physical (electronic) quantities within the devices' registers and subcomponents into other data similarly represented as physical quantities within the device subcomponents and registers and other such information storage, transmission or display capabilities.

Exemplary Circuits and Systems

Exemplary Microcontroller Power Supply

Switch mode power supplies, also called switch mode pumps (SMP), routinely provide power to microcontrollers, Into which they are integrated. SMP devices are well known in the art. With reference to FIG. 1, a microcontroller 60 contains a power supply system 50. Power supply system 50 provides a common supply voltage ('Vcc') 55 to energize microcontroller 60.

Power supply system 50 is constituted by SMP 185, and pump controller 180. 'Vcc' 55 is generated by SMP 185, under the control of pump controller 180, to which it is connected.

Pump controller 180 receives information, which may be generated elsewhere in microcontroller 60, and may regard power status therein. Such information may stimulate pump controller 180 to control SMP 185 to raise or lower the voltage of 'Vcc' 55. Thus the power supplied to microcontroller 60 by SMP 185 may be adjusted by pump controller 180 in response to microcontroller 60 power-based information.

In the present embodiment, power-based information regarding microcontroller 60 is provided to pump controller 180 by two signals, 113 and 115. Signal 113 is a 'pump' control signal. In one embodiment, 'pump' control signal 113 may range from 3.3 to 5.0 Volts (V). It is appreciated that this range, and ranges elsewhere herein, are exemplary, and may vary between various embodiments of the present invention, perhaps significantly, and may be dependent on aspects of design, fabrication, and application of the microcontroller constituting microcontroller 60. The 'pump' control signal 113, in the present embodiment, stimulates pump controller 180 to control SMP 185, regulating 'Vcc' 55 during normal operations of microcontroller 60.

Signal 115 is a 'switch mode pump power on reset' ('SMP POR') signal. In the present embodiment, 'SMP POR' signal 115 functions as a pump reset. 'SMP POR' 115 effectively enables boot-up of microcontroller 60. Prior to energizing microcontroller 60 at stable operational levels of 'Vcc' 55, 'SMP POR' 115 is generated upon sensing low voltage levels of 'Vcc' 55. Upon receipt of 'SMP POR' 115, pump controller 180 forces SMP 185 to boost 'Vcc' 55. In the present embodiment, 'SMP POR' 115 effectuates a reliable bootstrapping of power to energize microcontroller 60. In the present embodiment, 'SMP POR' 115 is an active signal when 'Vcc' 55 ranges from zero (0) V to approximately 2 V.

Exemplary Power On Reset Circuit

Figure 2:
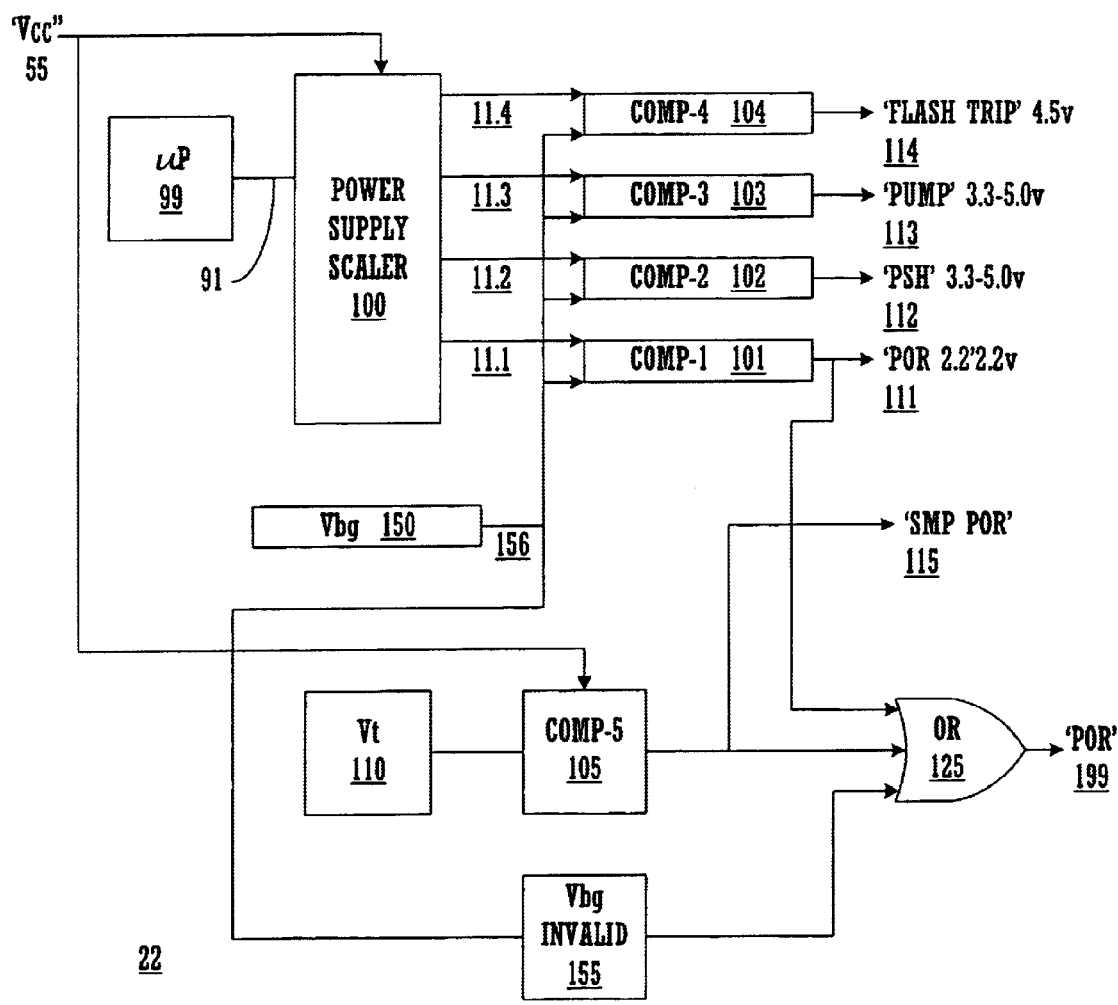
FIG. 2 is a block diagram depicting a novel power on reset (POR) circuit for a microcontroller, in accordance with one embodiment of the present invention.

In one embodiment of the present invention, a novel power on reset (POR) circuit 22 for a microcontroller (e.g., 60, FIG. 1) provides a power on reset function and other functions related to power state stability. Referring to FIG. 2, POR circuit 22 has 'Vcc' 55 as an input, thus sensing the condition of microcontroller power state from its voltage.

'Vcc' 55 is provided to power supply scaler 100. Power supply scaler 100 is connected via bus 91 to processor 99. Power supply scaler (VOS) 100 functions as a multichannel voltage divider, multiplying 'Vcc' 55 by a number of distinct values. In one embodiment, the values may be, selectively, fixed and programmable. In another embodiment, the values may all be programmable. In an alternative embodiment, the values may all be fixed. In embodiments wherein the values are programmable, processor 99 may interact with VOS 100, via bus 91, to effectuate programmatic adjustment of these values.

In the present embodiment, power supply scaler 100 has four (4) outputs, 11.1, 11.2, 11.3, and 11.4. The voltages constituting these outputs 11.1 through 11.4 depend on four (4) multiplier values of power supply scaler 100. In the present embodiment, two of the multiplier values are fixed, and two are programmable. These outputs are supplied, respectively, to comparators 101, 102, 103, and 104.

A bandgap reference generator (Vbg) 150 generates a precision reference voltage ('Vbg') 156. In one embodiment, Vbg 150 employs an array of bipolar junction devices to generate a predictable voltage, invariant with temperature. 'Vbg' 156 is an independent voltage from 'Vcc' 55, and is stable and precise over the microcontroller's normal operational range. 'Vbg' 156 is supplied to each of comparators 101 through 104.

Comparators 101 through 104 compare power supply scaler outputs 11.1 through 11.4, respectively, to 'Vbg' 156. In one embodiment, comparators 101 through 104 may be constituted by a network of MOSFETs. In another embodiment, other comparison-enabling technologies may be the devices constituting comparators 101 through 104.

Comparator 101 compares power supply scaler output 11.1 to 'Vbg' 156. In the present embodiment, power supply scaler output 11.1 is generated by a fixed 'Vcc' 55 multiplier value of power supply scaler 100. Upon comparison of output 11.1 to 'Vbg' 156, comparator 101 generates an output signal 'POR 2.2' 111. In the present embodiment, 'POR 2.2' 111 indicates that 'Vcc' 55 has a voltage of 2.2 V. In the present embodiment, this 'Vcc' 55 voltage level is equivalent to (e.g., indicative of a minimum stable operating voltages for all microcontroller circuits (e.g., of microcontroller 60; FIG. 1). 'POR 2.2' signal 111 is supplied to the input of a logic gate 125, and may be utilized elsewhere, also.

In the present embodiment, logic gate 125 is an OR gate. OR gate 125 has a 'POR' output 199. 'POR' 199, when active, e.g., a one (1) or non-zero value, effectively forces microcontroller (e.g., microcontroller 60; FIG. 1) into an all circuits reset, e.g., a power on reset (POR) condition. Since logic gate 125, in the present embodiment, is an OR gate, if 'POR 2.2' signal 111 is active, 'POR' 199 asserts a POR condition, e.g., asserts POR, until 'Vcc' reaches at least 2.2 V. Thus, in the present embodiment, circuit 22 effectuates a POR function. Circuit 22, however, goes beyond simply functioning as a POR circuit, as follows.

In one embodiment, circuit 22 exercises an operational "power supply health," capability, which can warn of approach to, or imminence of brownout. In the present embodiment, comparator 102 compares power supply scaler (VOS) 100 output 11.2 to 'Vbg' 156. VOS 100 generates output 11.2, in the present embodiment, from a programmable division of 'Vcc' 55.

Upon comparison of output 11.2 to 'Vbg' 156, comparator 102 generates a power supply health signal 'PSH' 112. In the present embodiment, 'PSH' signal 112 programmably ranges from a voltage value of 'Vcc' 55 between 3.3 V and 5.0 V. Through 'PSH' signal 112, circuit 22 may generate processor interrupts, flagging microcontroller power states possibly indicative of an approach towards, or imminence of, a brownout or near brownout condition.

Such brownout conditions may cause loss of data, or other deleterious effects. Interrupts may flag the processor to warn a user or take programmed corrective action. Such flags may include warnings such as "Save Data," or "Shutdown Any Critical Outputs." Advantageously, in certain applications, these power system health warnings may prevent problematic results from sudden onset of power instability or poor quality states with no prior warning. The programmability of the present embodiment enables application specific adjustment of the triggering level of the 'PSH' signal 112.

In one embodiment, circuit 22 exercises operational regulation of the power supply of a microcontroller (e.g., 50 and 60, respectively, FIG. 1). In the present embodiment, comparator 103 compares power supply scaler (VOS) 100 output 11.3 to 'Vbg' 156. VOS 100 generates output 11.3, in the present embodiment, from a programmable division of 'Vcc' 55.

Upon comparison of output 11.3 to 'Vbg' 156, comparator 103 generates a SMP control input signal 'pump' 113. In the present embodiment, 'pump' signal 113 programmably ranges from a voltage value of 'Vcc' 55 between 3.3 V and 5.0 V. Through feedback via 'pump' signal 13, circuit 22 may effectively exercise control over a SMP via stimulating or inhibiting its pump controller (e.g., 185 and 180, respectively; FIG. 1), dynamically changing 'Vcc' 55 programmatically. Thus, circuit 22 operationally effectuates total dynamic control over microcontroller power.

In one embodiment, circuit 22 enables auxiliary power related functions. In the present embodiment, a single auxiliary function provides a protective trip for a flash memory feature of a microcontroller (e.g., 60, FIG. 1). In another embodiment, any number of auxiliary functions may be enabled. In one embodiment, auxiliary functions may proceed from fixed divisions of 'Vcc' 55 by VOS 100. In another embodiment, they may proceed from programmable divisions of 'Vcc' 55 by VOS 100. In an alternative embodiment, multiple auxiliary functions may be enabled, some number from fixed divisions, and another number of functions from programmable divisions, of 'Vcc' 55 by VOS 100.

In the present embodiment, comparator 104 compares VOS output 11.4 to 'Vbg' 156. VOS 100 generates output 11.4, in the present embodiment, from a fixed division of 'Vcc' 55. Upon comparison of output 11.4 to 'Vbg' 156, comparator 104 generates an auxiliary signal 'flash trip' 114. In the present embodiment, 'flash trip' signal 114 is generated upon a voltage value of 'Vcc' 55 equal to 4.5 V. The 'flash trip' signal 114 enables placing a microcontroller flash memory in a safe state, upon a power condition indicated by 'Vcc' 55 falling to 4.5 V. Thus, circuit 22 may effectuate any number of auxiliary power related functions.

'Vbg' 156 is also supplied as a signal to a validation circuit block 155. Upon initially energizing the microcontroller (e.g., 60, FIG. 1) and circuit 22 therein, initial voltage states are low, unstable, and unreliable. In this initial condition, 'Vbg' precision voltage source 150 is non-operational; it is not generating a precision voltage and thus, 'Vbg' 156 is imprecise, erratic, and low. By design, during boot-up, 'Vbg' 156 is not relied upon as it is during normal operations in stable power states.

During boot-up, to help insure suppression of non-startup power functions, validation circuit block 155 provides a non-zero 'Vbg Invalid' signal 15.5 to OR gate 125. OR gate 125 correspondingly generates 'POR' signal 199, asserting POR, thus forcing all microcontroller circuits into reset.

Further, during initial power-up, microcontroller power essentially bootstraps through a mechanism enabled by one embodiment of the present invention. Still with reference to FIG. 2, circuit 22 provides an initial voltage reference generator (Vt) 110. Upon initial energization, Vt 110 produces, a signal 11.0. In one embodiment, signal 11.0 is a current. In another embodiment, signal 11.0 may be a voltage. Vt 110 is a reliable initial, primitive power source.

In the present embodiment, signal 11.0 is a current, and is supplied to comparator 105. Comparator 105 also receives 'Vcc' 55 as an input. Comparator 105 compares 'Vcc' 55 and signal 11.0, and generates a non-zero 'SMP POR' signal 115 for any comparison equivalent to a value of 'Vcc' 55 less than a value between 1.5 V and 2.0 V. Once 'Vcc' rises to a value above a value between 1.5 V and 2.0 V, 'SMP POR' signal 115 becomes a zero signal. 'SMP POR' signal 115 is a dual input.

First, 'SMP POR' signal 115 is inputted to OR gate 125. Thus, for any value of 'Vcc' 55 less than a value between 1.5 V and 2.0 V, helps to suppress non-startup power functions, during boot-up. OR gate 125 correspondingly generates 'POR' signal 199, asserting POR, thus forcing all microcontroller circuits into reset.

Simultaneously, 'SMP POR' signal 115 has a second function. It is inputted to pump controller 180 (FIG. 1). This stimulates pump controller 180 to cause SMP 185 (FIG. 1) to pump up 'Vcc' 55. Thus, effectively, 'SMP POR' signal 115 serves to prime the microcontroller power state, forcing 'Vcc' to rise. It is deactivated when, in the present embodiment, 'Vcc' reaches a stable 2.2 V, e.g., when normal operational power management may take over control.

Exemplary System

Figure 3:
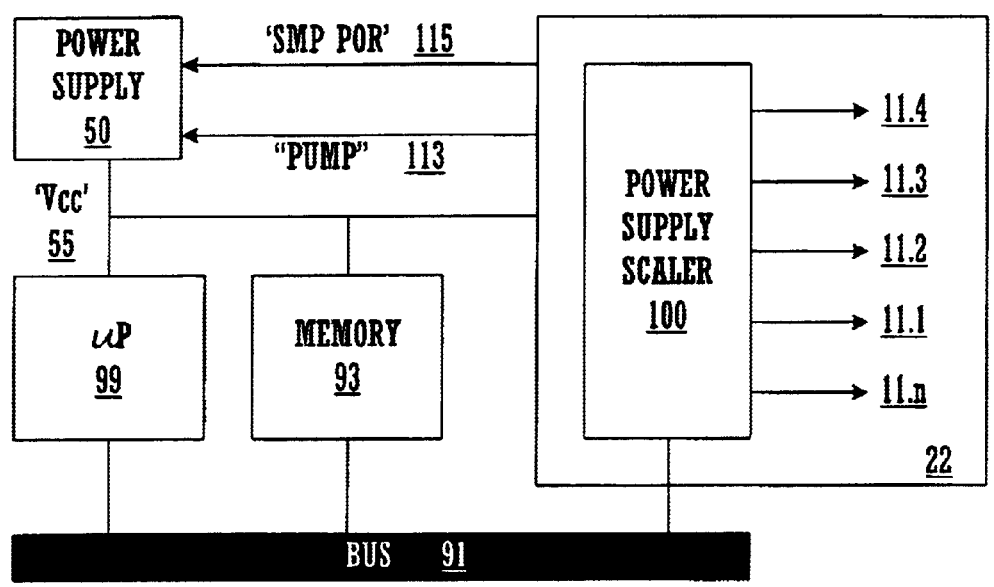
FIG. 3 is a block diagram depicting a bus interconnection between a microprocessor and a dynamic voltage scaler in a microcontroller, in accordance with one embodiment of the present invention.

With reference to FIG. 3, a system 300 enables interactive, programmatic adjustment of a microcontroller power supply scaler 100, in one embodiment of the present invention. Processor 99 is interconnected, via bus 91, with power supply scaler 100, and with memory 93. Power supply scaler 100 is an integral and operant part of circuit 22 (e.g., FIG. 2). In one embodiment, system 300 is an embedded and operant part of a microcontroller (e.g., 60; FIG. 1).

Power supply 50 provides a common power supply voltage 'Vcc' 55 to processor 99 and to memory 93. Further, 'Vcc' 55 is supplied to power supply scaler (VOS) 100. It is appreciated that 'Vcc' 55 is also available to other components of circuit 22, (e.g., comparator 105; FIG. 2). Circuit 22 inputs control signals 'SMP POR' 115 and 'pump' 113 to power supply 50, for dynamic control over 'Vcc' 55 during boot-up and normal operations, respectively.

Power supply scaler (VOS) 100 produces outputs 11.1 through 11.4 (e.g., circuit 22; FIG. 2) by fixed and/or programmatic division of 'Vcc' 55. It is appreciated that any number n of such outputs may be derived; thus an $n^{th}$ VOS 100 output 11.n is depicted. Certain of these outputs, e.g., 11.3, may be applied to derive control signals for power supply 50, e.g., 'pump' 113. Other such outputs, e.g., 11.2, may derive other signals related to power status (e.g., 'PSH' 112; FIG. 2). In one embodiment of the present invention, these outputs may be programmatically adjustable. In the present embodiment, outputs 11.2 and 11.3 are programmatically adjustable. Thus, VOS 100, in the present embodiment, is an agent on bus 91 of system 300.

Processor 99 executes computer readable and computer executable instructions. The computer readable and computer executable instructions reside, for example, in data storage features such as memory 93 and/or within itself. These instructions enable communicable programmatic operation and control. In the present embodiment, processor 99 senses 'Vcc' 55, as supplied to it. Controlling the microcontroller (e.g., 60; FIG. 1), processor 99 programmatically determines a power state optimal for execution of the operant condition and/or application.

In the present embodiment, processor 99 also programmatically determines corresponding divisional 'Vcc' 55 values to be employed by VOS 100. Intercommunicating with VOS 100, processor 99 via bus 91, processor commands VOS 100 to adjust its programmable 'Vcc' divisional values accordingly. Thus, system 300 enables dynamic control over microcontroller power through the operational interaction of processor 99 and VOS 100, via bus 91.

Exemplary Power Supply Scaler

Figure 4:
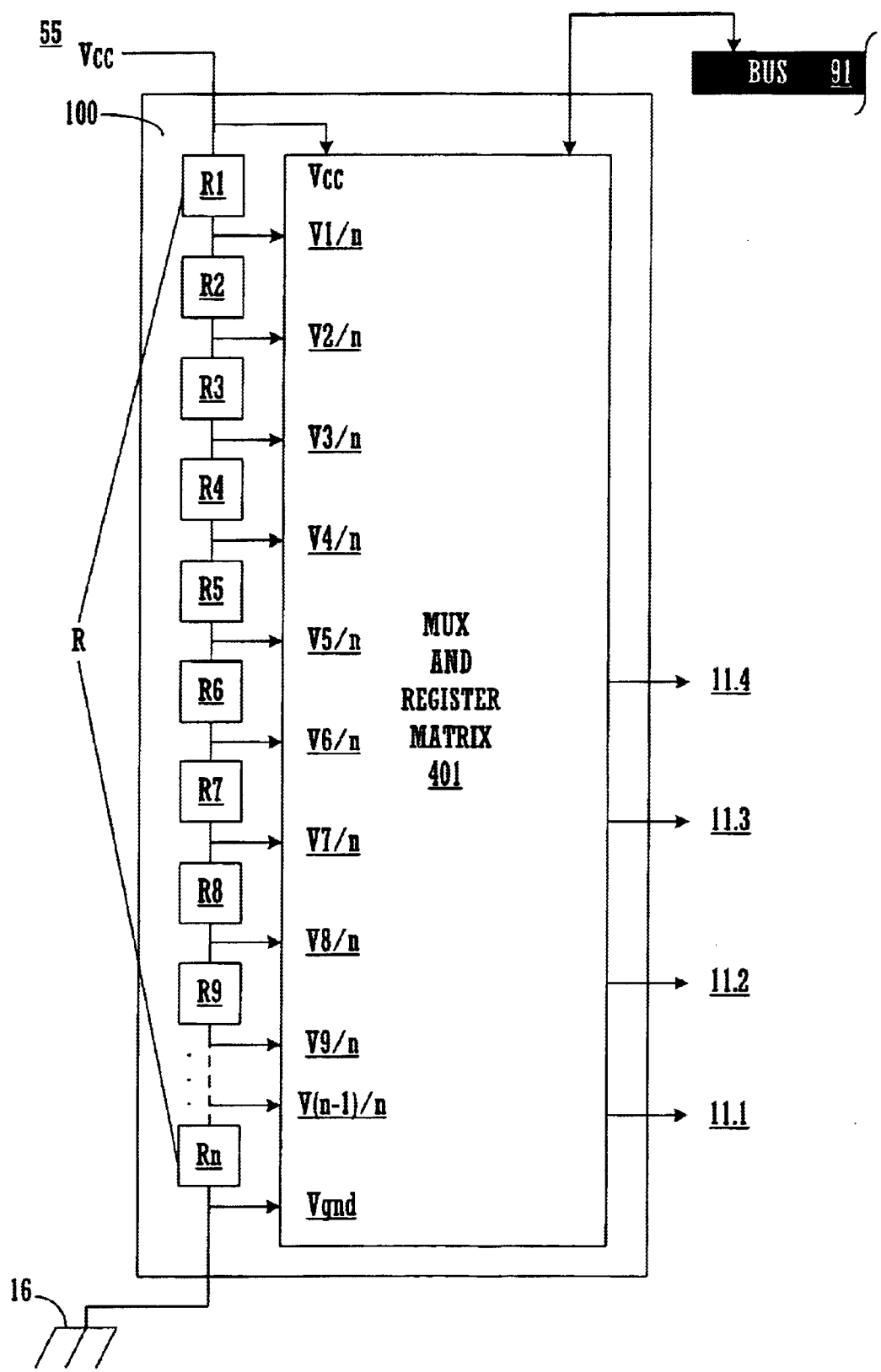
FIG. 4 is a block diagram depicting the details embodied within a dynamic voltage scaler in a microcontroller, in accordance with one embodiment of the present invention.

With reference to FIG. 4, a power supply scaler 100, in accordance with one embodiment of the present invention, is depicted. Power supply scaler (VOS) 100, in accordance with the present embodiment, may be integrated into a POR circuit with power management capabilities (e.g., 22; FIGS. 2, 3). Thus, VOS 100 may be utilized to dynamically interact with a processor (e.g., 99; FIGS. 2, 3) to help enable a system (e.g., 300; FIG. 3) capable of programmable microcontroller power management.

VOS 100 receives a common power supply (Vcc) voltage 'Vcc' 55 as an input. In one embodiment, VOS 100 contains a variable path voltage divider R. Voltage divider R divides 'Vcc' 55 into a number of aspect voltages, each aspect voltage corresponding to a separate voltage quantity, and each separate voltage quantity an independent multiple of 'Vcc' 55. Voltage divider R may be an array of any devices capable of dividing voltage. In one embodiment, voltage divider R may be resistors. In one embodiment, it may be capacitors. In one embodiment, it may be MOSFETs. In another embodiment, it may be an array of other charge sensitive devices. In yet another embodiment, voltage divider R may be current-sensitive devices.

In the present embodiment, voltage divider R is constituted by a series of n precision resistors, R1 through Rn. At the junction of each resistor R1 through Rn, 'Vcc' 55 is divided into a voltage proportional to the voltage dropped across the resistors to that point; e.g., voltage at the junction of any two resistors is equal to the full voltage of 'Vcc' 55 entering voltage divider R multiplied by the ratio of the resistance to that point to the total resistance. For a voltage divider (e.g., R) constituted by n resistors, the voltage at the junction point e of the $e^{th}$ resistor and the next sequential $f^{th}$ resistor, for example, is given by the expression $$V_e = (Vcc)(eR)/nR.$$

Each junction point between resistors is a voltage tap, e.g., voltage taps V1/n through V(n−1)/n. After the last resistor, Rn, voltage divider R is connected with ground 16.

Each voltage derived at each tap, Vcc, and ground, is connected to multiplexor (MUX) and register matrix 401. In the present embodiment, within MUX and register matrix 401 is an array of analog MUXs and registers. Further, MUX and register matrix 401 is connected to system bus 91, enabling an interconnection to a processor (e.g., 99; FIGS. 2, 3), and making VOS 100 and any circuit (e.g., 22; FIGS. 2, 3) enveloping it, an agent of a system participating in the interconnection (e.g., 300; FIG. 3).

In the present embodiment, VOS 100 has four distinct outputs, 11.1, 11.2, 11.3, and 11.4. It is appreciated that VOS may have any number n of outputs (e.g., 11.n; FIG. 3). Further, it is appreciated that these outputs, 11.1 through 11.4, may be outputs being a fixed multiple of 'Vcc' 55, a programmable multiple of 'Vcc' 55, or a mixture of fixed and programmable multiples of 'Vcc' 55. In one embodiment, fixed multiple outputs may be hard wired to a particular voltage tap, V1/n through V(n−1)/n. Alternatively, in another embodiment, fixed 'Vcc' multiple outputs may be programmatically fixed.

In the present embodiment, outputs 11.1 and 11.4 are fixed Vcc multiple outputs, and outputs 11.2 and 11.3 are programmable Vcc multiple outputs. In the present embodiment, MUX and register matrix 401 links outputs, 11.1 through 11.4, to taps V1/n through V(n−1)/n; outputs 11.1 and 11.4 programmatically fixed to specific, individual taps. Further, MUX and register matrix connects outputs 11.2 and 11.3 to any tap V1/n through V(n−1)/n to effectuate programmatically derived voltage levels for those outputs, corresponding to programmatically desired multiples of 'Vcc' 55.

In the present embodiment, this is accomplished by instructions stored in registers within MUX and register matrix 401, off system bus 91. Thus, a processor (e.g.; 99, FIGS. 2, 3) interconnected via system bus 91 with VOS 100, specifically with MUX and register matrix 401, may control which taps programmable Vcc multiple outputs 11.2 and 11.3 are connected to, dynamically changing corresponding power parameters associated therewith (e.g., 'PSH' signal 112 and 'pump' 113; FIGS. 1–3). In this way, in the present embodiment, a processor (e.g., 99; FIGS. 2,3) may dynamically control power status by interaction with a circuit (e.g., POR circuit 22; FIGS. 2, 3) hosting VOS 100.

Exemplary Processes

Execution of Basic Power on Rest Function

Figure 5:
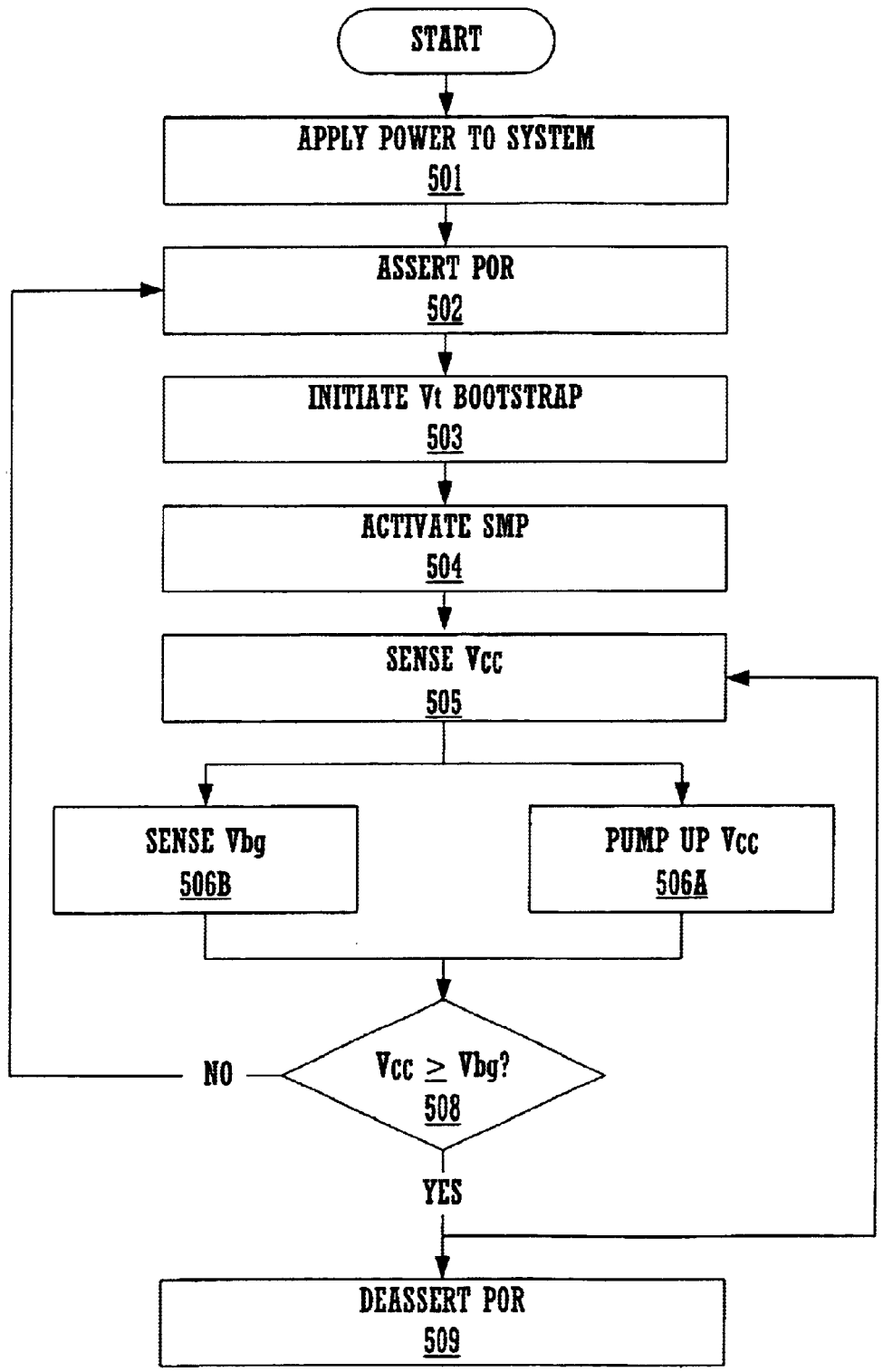
FIG. 5 is a flow chart of the steps in a process for accomplishing a POR enabled safe boot-up of a microcontroller, in accordance with one embodiment of the present invention.

Referring now to FIG. 5, the steps in a process 500 execute a basic power on reset (POR) function, employing one embodiment of the present invention. Although specific steps are disclosed in flowchart 500, such steps are exemplary; e.g., the present invention is well suited to performing various other steps or variations of the steps recited in FIG. 5.

Beginning at step 501, power is initially supplied to a previously de-energized microcontroller system (e.g., 60; FIG. 1).

Immediately upon initial power presence, a POR circuit (e.g., 22; FIGS. 2,3) integral to the microcontroller asserts a POR condition, step 502. This effectively forces all other microcontroller systems and circuits into a reset condition, to enable a safe boot-up and rise to a stable power state.

An initial voltage generation block (e.g., Vt 110; FIG. 2) begins to generate a highly reliable, primitive voltage (e.g., 11.0; FIG. 2) which is compared with whatever common supply voltage ('Vcc' 55; FIGS. 1–4) is then present. This comparison results in generation of a priming signal (e.g., 'SMP POR' 199; FIGS. 1, 2). The priming signal reassures assertion of POR (e.g., forcing 'POR' 199; FIG. 2), and is transmitted to a power supply (e.g., 50; FIGS. 1), where it activates a switch mode pump (SMP, e.g., SMP 185) to pump up microcontroller system power; step 504.

'Vcc' (e.g., 55; FIGS. 1–4) is constantly sensed during this operation; step 505. As long as 'Vcc' remains low, priming SMP activation, e.g., pumping 'Vcc' up, continues; step 506A.

Also sensed is a bandgap reference voltage (e.g., 'Vbg' 156; FIG. 2) generated by a precision voltage source (e.g., Vbg 150; FIG. 2); step 506B. During boot-up, 'Vbg' (e.g., 156; FIG. 2) is considered extremely unreliable. Sensed by a validity block (e.g., Vbg Invalid 155; FIG. 2) generating a corresponding output, it also reinforces the POR condition on a 'Vbg' Invalid condition (e.g., asserts 'POR' 199; FIG. 2). However, sensing its stabilization indicates that power states are becoming stable, reliable, and operably applicable, and it releases its POR reinforcing signal.

With 'Vcc' and 'Vbg' both being sensed, both continue to rise. 'Vcc' is continually pumped up by the SMP per step 506A. As 'Vcc' rises and approaches operable stability, the output of Vbg, e.g., 'Vbg', becomes more robust and stable. 'Vcc' and 'Vbg' are compared (e.g., by comparator 103, step 508. If the comparison of 'Vcc' to 'Vbg' remains suboptimal, POR continues to be asserted, looping back to step 502. Once the comparison of 'Vcc' to 'Vbg' becomes favorable, the basic POR condition is de-asserted; step 509.

Figure 6:
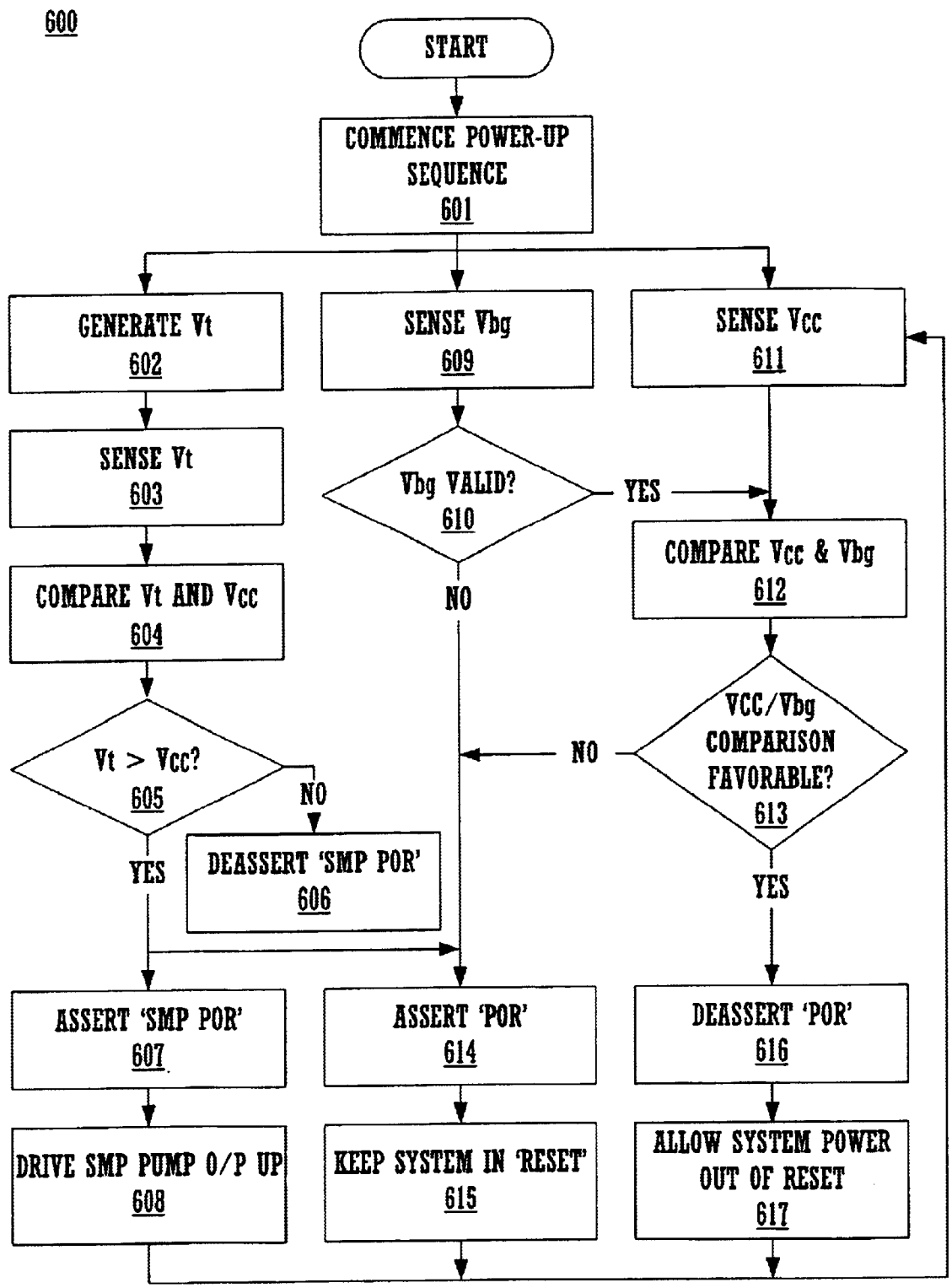
FIG. 6 is a flow chart of the steps in a process asserting a POR condition and related power stability microcontroller functions, in accordance with one embodiment of the present invention.

With reference to FIG. 6, the steps in a Process 600 allow integration of POR functions and power stability functions in a microcontroller (e.g., 60; FIG. 1), in accordance with one embodiment of the present invention. Although specific steps are disclosed in flowchart 600, such steps are exemplary; e.g., the present invention is well suited to performing various other steps or variations of the steps recited in FIG. 6.

Beginning with step 601, a microcontroller commences a power up sequence.

In step 602, an initial voltage generation block (e.g., Vt 110; FIG. 2) begins to generate a highly reliable, primitive voltage (e.g., 11.0; FIG. 2). The generated primitive voltage is sensed; step 603.

The primitive voltage sensed is compared with whatever common supply voltage ('Vcc' 55; FIGS. 14) is then present; step 604. Depending on the comparison or 'Vt' to 'Vcc', a decision is made in step 605.

If the comparison of 'Vt' to 'Vcc' reveals that Vt is substantially more robust than 'Vcc', the comparison results in generation of an initial POR signal, (e.g., 'SMP POR' 115; FIGS. 1, 2); step 607.

Beside assuring that all microcontroller assets are kept safely in reset under this condition (simultaneously asserting 'POR'; step 614), 'SMP POR' assertion causes the output of a SMP (e.g., SMP 185, FIG. 1) to be driven up; step 608. Thus, microcontroller power supply output is primed to raise 'Vcc' and power up safely and effectively.

Upon the comparison of 'Vcc' to 'Vt' becoming favorable in step 605, 'SMP POR' is de-asserted; step 606.

In step 609, the output 'Vbg' of a precision voltage reference (e.g., 150 and 156, respectively; FIG. 2) is sensed. During initial powering up, 'Vbg' is considered extremely unreliable.

An output corresponding to the condition of 'Vbg' is generated by a 'Vbg' validity block (e.g., 'Vbg' Invalid 155; FIG. 2); step 610.

If 'Vbg' is invalid, 'POR' is asserted correspondingly; step 614. Upon assertion of this 'POR', all power sensitive microcontroller systems and circuits not involved in powering up the microcontroller are held safely in a reset condition; step 615.

During all stages up to this point, 'Vcc' has been sensed, in whatever primitive state it has during boot-up. Sensed 'Vcc' is monitored in step 611.

In step 612, 'Vcc' as specifically monitored in step 611, is compared to 'Vbg', as microcontroller power is ascending.

A decision is reached in step 613 based on the favorability of the 'Vcc' comparison to the 'Vbg' reference. If the comparison is unfavorable, 'POR' is asserted, step 614. Correspondingly, all power sensitive microcontroller systems and circuits not involved in powering up the microcontroller are held safely in a reset condition; step 615.

If, in step 613, 'Vcc' is deemed to compare favorably to the 'Vbg' reference, 'POR' will be de-asserted; step 616.

Correspondingly, in step 617, all microcontroller systems will be allowed out of safe power on reset condition, for normal operations.

Upon completion of any or all of steps 608, 615, and steps 617, process 600 loops back to repeat step 611. Further subsequent steps are repeated accordingly.

Exemplary Power System Health Function Implemented

Figure 7:
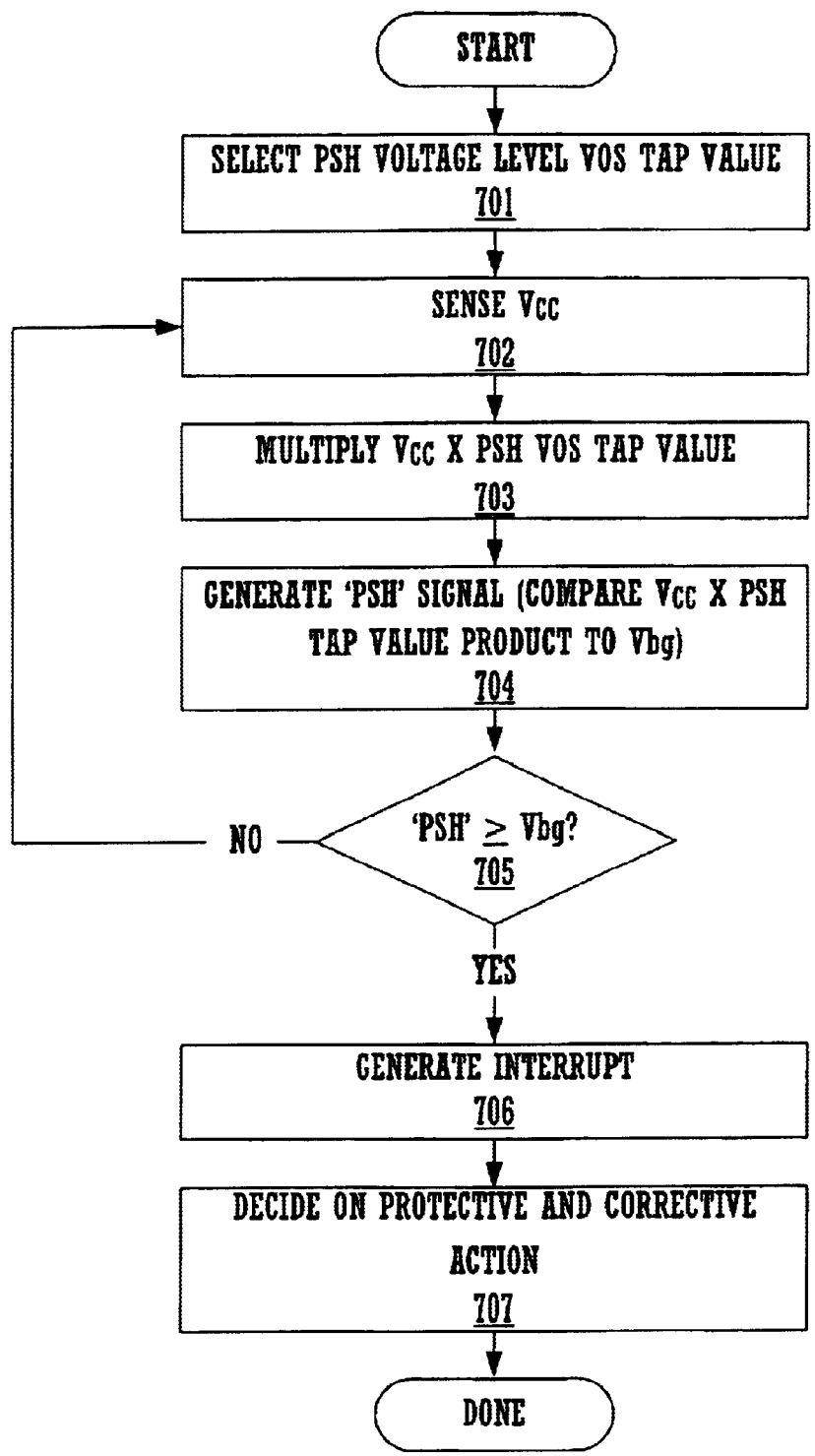
FIG. 7 is a flow chart of the steps in a process for implementing a power supply health indication function utilizing POR system circuitry, in accordance with one embodiment of the present invention.

With reference to FIG. 7, the steps in a process 700 enable a power system health (PSH) function, utilizing POR circuitry, in accordance with one embodiment of the present invention. PSH functions may warm of approach to, or impending brownout, or other adverse power state, allowing protective and/or corrective action to be taken.

Flowchart 7 includes processes of the present invention which, in one embodiment, are carried out by a processor, e.g., 99, and electrical components under the control of processor readable and processor executable instructions. The processor readable and processor executable instructions reside, for example, in data storage features such as memory 93 and/or within the processor, itself of FIG. 3. However, the processor readable and processor executable instructions may reside in any type of processor readable medium. Although specific steps are disclosed in flowchart 7, such steps are exemplary. That is, the present invention is well suited to performing various other steps or variations of the steps recited in FIG. 7. Within the present embodiment, it should be appreciated that the steps of flowchart 7 may be performed by software or hardware or any combination of software and hardware.

Beginning with step 710, a POSH level of 'Vcc' is set by programmatically selecting a tap value of a precision voltage divider in a power supply scaler constituting a part of a POR circuit (e.g., V1/n through v(n−1)/n, R, 100, and 22, respectively; FIGS. 4, 2, respectively), in accordance with one embodiment of the present invention. Programmatic selection may be made by a processor Implementing interconnected via a bus with the power supply scaler, (e.g., 99, 91, 100; FIG. 4). The processor executes computer readable and computer executable instructions. The computer readable and computer executable instructions reside, for example, in data storage features (e.g., memory 93; FIG. 3) and/or within itself. These instructions enable communicable programmatic operation and control. In the present embodiment, the processor senses 'Vcc' as supplied to it, and sets the taps to correspond to a programmatically determined optimal PSH power state for execution of the operant condition and/or application. It interacts with the POR circuit to effectuate control as follows.

In step 702, the POR circuit senses 'Vcc'.

'Vcc' is multiplied by the programmatically PSH tap value; step 703.

The resulting voltage product is compared (e.g., by comparator 102; FIG. 2), in step 704, to a precision reference voltage (e.g., 'Vbg' 156; FIG. 2) to generate a 'PSH' signal (e.g., 'PSH 3.3–5.0 V' 112; FIG. 2).

In step 705, a decision is made. If the 'PSH' signal compares favorably with 'Vbg', process 700 loops back to step 702, continuing to monitor Vcc.

However, if the 'PSH' comparison to 'Vbg' in step 705 reveals that 'PSH' is below a favorable comparison margin with 'Vbg', the condition is communicated to processor 99, generating an interrupt, step 706.

Programmatically, the processor can warn a user, or take automatic protective and/or corrective action, and place critical microcontroller outputs in a safe condition. At this point, process 700 is complete.

In summary, the present invention provides a robust circuit and system which effectively functions to provide power on reset (POR) capabilities for a microcontroller, at more than a single level, as well as post-boot-up power stability functions. The present invention also provides a circuit and system that utilizes the resources of installed POR circuitry to additionally control a microcontroller's switch mode pump (SMP), both during boot-up and during normal post-boot-up operations. Further, the present invention provides a circuit and system that applies the resource of embedded POR circuitry to other power stability applications. Further still, the present invention provides a circuit and system that retains the advantages of existing POR technology, accomplishing the foregoing achievements without placing any extra demand on system resources or requiring additional systems.

In accordance with one embodiment of the present invention, a circuit for providing power stability functions for a microcontroller, during startup and normal operations performing power on reset functions and an array of power stability functions. The power on reset functions both hold the microcontroller in a safe power on reset condition (POR), reinforce the POR hold, and force its switch mode pump to drive up voltage provided to its common supply source. The power stability functions constitute a power on reset function, a power supply health, e.g., power state condition monitoring function, a control function for dynamically controlling the common supply source, and auxiliary functions, which may be protective of a flash memory. The power on reset function operates at a fixed and/or programmably changeable voltage levels. In one embodiment, the POR circuit is interconnected with a processor through a bus, enabling programmatic processor control of microcontroller power through interaction with the POR circuitry.

An embodiment of the present invention, a novel power on reset circuit for a microcontroller, is thus described. While the present invention has been described in particular embodiments, it should be appreciated that the present invention should not be construed as limited by such embodiments, but rather constructed according to the below claims.

What is claimed is:

1. A circuit for providing power on reset functions and a plurality of functions for power system control for a microcontroller, comprising:

a first stage for performing power on reset functions and functions related to operational, post power on reset power stability;

a second stage for stimulating a reliable source of startup power during power on reset, wherein said second stage produces a first signal for forcing a switch mode pump to drive up voltage provided to said common power supply and a second signal forcing said microcontroller into a power on reset condition;

a bus for providing an interconnection with a processor; and a processor providing dynamic control over said first stage.

2. The circuit as recited in claim 1, wherein said first stage further comprises a power supply scaler for dividing a common power supply output into a plurality of divisional outputs.

3. The circuit as recited in claim 2, wherein said power supply scaler comprises:

a precision divider of said common power supply output having a plurality of taps, each providing an independent, distinct division of said common supply output;

a matrix of multiplexers and registers for selecting from said plurality of taps and correspondingly configuring said plurality of divisional outputs.

4. The circuit as recited in claim 3, wherein said matrix of multiplexers and registers selects from said plurality of taps, correspondingly configuring said plurality of divisional outputs under control of said processor.

5. The circuit as recited in claim 1, wherein said plurality of power stability functions comprise:

a) a power on reset function;
   b) a power supply monitoring function;
   c) a control function for said common supply source; and
   d) auxiliary functions.

6. The circuit as recited in claim 5, wherein said power on reset function operates at a fixed voltage level.

7. The circuit as recited in claim 5, wherein said power supply monitoring function further comprises a power supply health signal.

8. The circuit as recited in claim 5, wherein said control function for said common supply source further comprises a signal for controlling said switch mode pump.

9. The circuit as recited in claim 5, wherein said power stability functions are, selectively, programmable, and operable at a fixed voltage.

10. The circuit as recited in claim 5, wherein one of said auxiliary functions further comprises a trip signal for a flash memory.

11. A circuit for providing power on reset functions and a plurality of functions power system control for a microcontroller, comprising:

a) a power supply scaler for receiving an input voltage from a switched mode pump common supply source, dividing said input voltage into a plurality of output scaler voltages;

b) a source of a precision reference voltage for comparison to said plurality of scaler output voltages;

c) a plurality of comparators for comparing said precision reference voltage and said plurality of scaler output voltages;

d) a qualifier for validating said precision reference voltage;

e) an initial power reference source for providing a reliable voltage reference while energizing said microcontroller; and f) a logic gate for asserting a reset condition on said microcontroller.

12. The circuit as recited in claim 11, wherein said power supply scaler further comprises:

a1) a variable path divider of said input voltage; and
   a2) a multiplexer and register matrix.

13. The circuit as recited in claim 12, wherein said variable path voltage divider comprises an array of resistors.

14. The circuit as recited in claim 12, wherein said variable path voltage divider comprises an array of capacitors.

15. The circuit as recited in claim 12, wherein said variable path voltage divider comprises an array of charge-sensing devices.

16. The circuit as recited in claim 12, wherein said variable path voltage divider comprises an array of metal oxide semiconductor field effect transistors.

17. The circuit as recited in claim 11, wherein said variable path voltage divider comprises an array of current sensing devices.

18. The circuit as recited in claim 11, wherein said precision reference voltage is independent of said input voltage, and is monitored by a precision reference voltage monitor, said precision reference voltage monitor generating a precision reference voltage validity signal, said precision reference voltage validity signal comprising a zero state when said precision reference voltage is valid, and a non-zero state when said precision reference voltage is not valid.

19. The circuit as recited in claim 17, wherein said plurality of comparators each compare a plurality of output voltages from said power supply scaler, each of said output voltages individually, to said precision voltage reference, and correspondingly generate one of a plurality of power stability signals, said plurality of power stability signals comprising:

a) a power on reset signal;
   b) a power supply monitoring signal;
   c) a control signal for said switch mode pump; and
   d) auxiliary signals.

20. The circuit as recited in claim 19, said source of an initial power reference source further comprises:

e1) an initial voltage generator; and e2) a initial power comparator, said initial power comparator sensing an input generated by said initial voltage generator and said common supply source, comparing them one to another, and generating an initial power comparator output; said initial power comparator output initially driving a switch mode pump to raise voltage of said common supply source.

21. The circuit as recited in claim 20, wherein said logic gate comprises an OR gate, said OR gate generating an OR gate output wherein said OR gate output, in one state initiated by any non-zero value of a plurality of inputs, asserts a power on reset condition, and in another state by all zero values of said inputs, de-asserts said power on reset condition, said inputs comprising:

f1) said power on reset signal;

f2) said initial power comparator output; and f3) said precision reference voltage validity signal.

22. In a microcontroller having a power supply a method of performing power stability functions utilizing a power on reset circuit, during startup and post-startup operations, said method comprising:

a) performing a power on reset function during startup wherein said power supply is fed by a switched mode pump; and b) utilizing said power on reset circuit, during post-startup operation to:

perform power on reset functions upon trip;

monitor a condition of said power supply;

control said switch mode pump; and provide auxiliary control, indication, and memory protective trip.

* * * * *